May 19, 1925.

A. CARPENTER

MACHINE FOR ASSEMBLING INSULATOR KNOBS

Filed Aug. 9, 1920    4 Sheets-Sheet 1

Alexander Carpenter

INVENTOR.

BY

Edwin P. Corbett

ATTORNEY.

May 19, 1925.                                              1,538,238
A. CARPENTER
MACHINE FOR ASSEMBLING INSULATOR KNOBS
Filed Aug. 9, 1920          4 Sheets-Sheet 4

*Alexander Carpenter*
INVENTOR.

BY
*Edwin P. Coates*
ATTORNEY.

Patented May 19, 1925.

1,538,238

UNITED STATES PATENT OFFICE.

ALEXANDER CARPENTER, OF CAREY, OHIO, ASSIGNOR TO THE C. A. C. AUTOMATIC MACHINE COMPANY, OF CAREY, OHIO, A CORPORATION OF OHIO.

MACHINE FOR ASSEMBLING INSULATOR KNOBS.

Application filed August 9, 1920. Serial No. 402,424.

*To all whom it may concern:*

Be it known that I, ALEXANDER CARPENTER, a citizen of the United States of America, residing at Carey, in the county of Wyandot and State of Ohio, have invented certain new and useful Improvements in Machines for Assembling Insulator Knobs, of which the following is a specification.

My invention relates to a machine for assembling insulator knobs. It has to do with the provision of apparatus for bringing together a two-part insulator knob and the nail and washer therefor and so operating upon the nail as to ensure that these parts will remain together for shipment and subsequent application.

Hitherto, these assembling operations have been accomplished by hand. The two parts have been placed together and a nail and washer placed thereon manually, the nail then being subjected to what is known as a "lipping" device which operates to so distort the nail that it cannot be withdrawn from the porcelain knob and thereby serves to hold all of the parts in assembled relation.

My invention contemplates the provision of an endless carrier for successively conducting the two-part knob to an assembling station and this endless carrier operates in conjunction with a nail delivering apparatus and with a washer delivering apparatus as well as a nail lipping device all located at the assembly station for bringing about assemblage of the parts and lipping of the nail to maintain such assemblage. My nail delivering apparatus desirably comprises a trough for delivering the nails one by one to a given point and a magnet member for picking up such nails and moving them successively to a point above the assembly position of the insulator knobs where they are forced downwardly through the hole in the insulator and through the washer by a plunger. The washer delivering device comprises a vertical slide together with a means for selecting successively presented washers from said vertical slide and delivering them to a point immediately above the porcelain knobs where the holes of the washers register with the holes of the knobs. My nail lipping device comprises a means for forcing the lower end of the nail depending from the knobs into contact with dies that swage out a small lug on either side of the nail.

I have also provided a simple and effectual means for automatically kicking out the assembled knobs from their containing cups shortly after they are assembled. This takes the form of a hub on one of the sprocket wheels. As the nail of each assembled knob contacts with this hub, this nail is lifted and consequently forces the knob out of its cup.

There are many other features of advantage and various novel structural characteristics of my invention which will appear as this description progresses.

The preferred embodiment of my invention is shown in the accompanying drawings wherein similar characters of reference designate corresponding parts and wherein:

Figure 8 is a side elevation of the structure shown in Figure 7.

In the drawings, my machine is shown as comprising a base 1 upon the ends of which are mounted upright standards 2 and 3 carrying at their upper ends horizontal plates 4 and 5. The inner ends of these horizontal plates are upwardly offset as at 6 and 7 and upon these offset extensions 6 and 7 there is bolted a table member 8.

Bolted to the under sides of horizontal plates 4 and 5 and within the upright standards 2 and 3 are downwardly depending bearings 9 and 10 which support transversely extending shafts 11 and 12. Each of these shafts 11 and 12 carries a pair of spaced sprockets, one pair being designated 13 and the other pair being designated 14. The sprockets of each pair are spaced by a drum 15 and 16, and these drums being of a diameter determinately less than the diameter of the sprockets. Extending outwardly from one side of the pair of sprockets 13 are a plurality of concentrically arranged spaced pins 17, one for each of the sprocket grooves 18 and preferably disposed upon the radius lines which extend from the shaft 11 to the sprocket groove 18.

Figures 4, 5, 6:
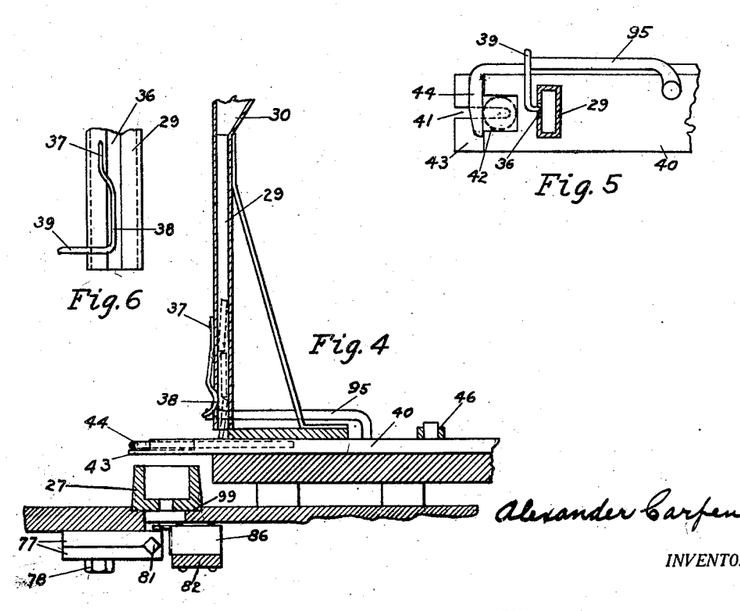
Figure 4 is a detail view of the washer delivering apparatus.
Figure 5 is a detail in plan of the slide member which receives the lowermost washer from the vertical washer slide and positions it immediately over the insulator knob.
Figure 6 is a detail in section illustrating the finger which normally precludes downward movement of the washers.
Figures 14, 15:
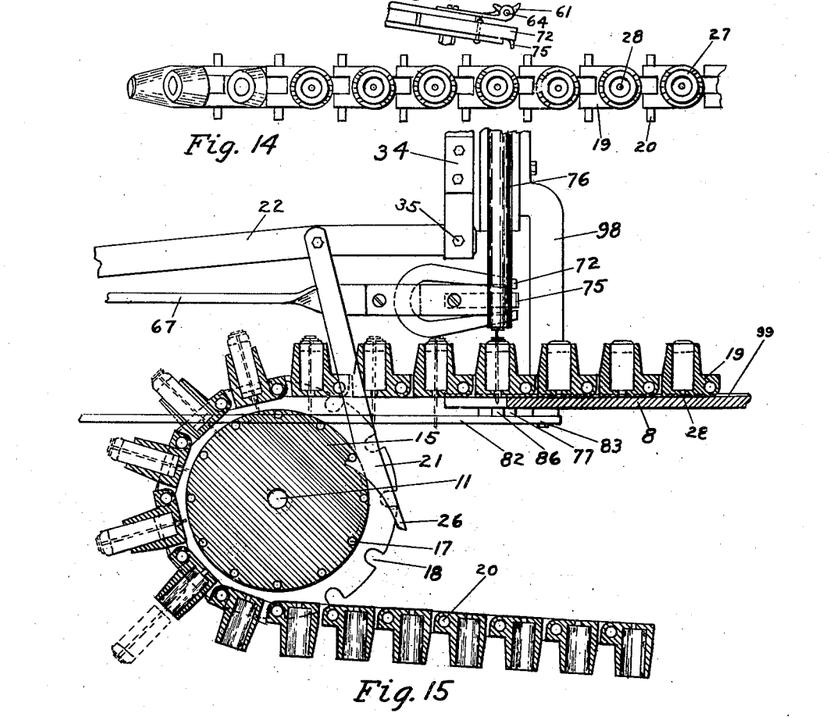
Figure 14 is a detail in plan which is enlarged to more clearly show the structure of my device adjacent the assembly station.
Figure 15 is a side elevation of the structure shown in Figure 14.
Figure 16:
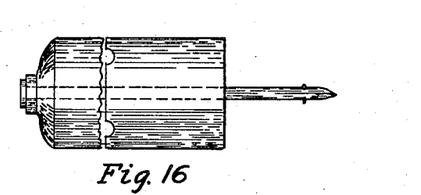
Figure 16 is a side elevation of one of the insulator knobs assembled by my apparatus.

Mounted upon and in cooperative relation to the sprockets 13 and 14 I have provided a sprocket chain 19 which is constructed to pass between the sprockets of each pair and the connecting pins 20 between the links of the sprocket chain are successively presented to and gripped by the sprocket grooves 18. The sprocket chain 19 is prevented from having undue lateral movement by the longitudinal groove 99, shown in Figures 4 and 15, in the top of the table member 8.

A step-by-step movement is imparted to the sprockets and thereby to the chain by means of a hook-like dog 21 which is connected at its upper end to a lever 22 fulcrumed as at 23 and operable by a roller 24 extending into the groove of a cam member 25. This cam member is rigidly mounted upon the shaft 100 which constitutes the main driving shaft of my machine and which may be driven by means of a pulley, as shown at 101. The hook-like dog 21 is provided with a heel 26 of a length sufficient to prevent the dog from slipping into a position behind the oncoming pin.

Each link of the sprocket chain carries a cup 27 which is desirably of a substantially cylindrical form and which is provided with a cylindrical hollow interior. The base of each cup is desirably apertured as at 28. These cups may vary as to size and form and are designed to receive the two parts of the insulator in superimposed relation and with their nail apertures in registry. These cups may be supplied with the insulators either manually or automatically.

Figure 1:
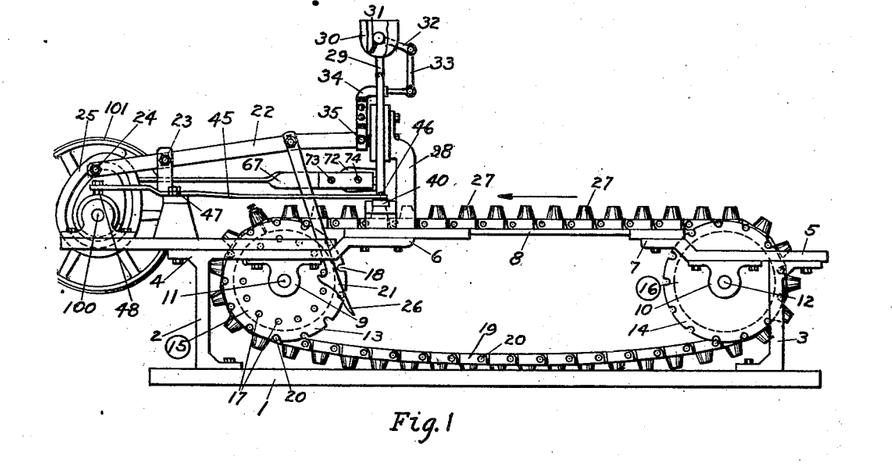
Figure 1 is a side elevation of my machine for assembling insulator knobs.
Figure 2:
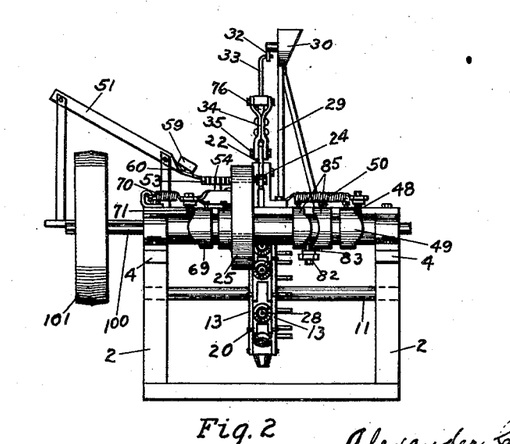
Figure 2 is an end elevation of the structure shown in Figure 1 and looking from the left thereof.

It will be understood that the superimposed porcelain knob parts are placed in their cups at the right hand side of the machine as shown in Figure 1 and that they approach the assembling station by a step-by-step movement. The approximate location of this assembling station is indicated on the drawings by the upright yoke member 98 mounted upon the table 8. To the left of this yoke member in Figure 1 is shown a vertical washer slide 29 upon the top of which is mounted a hopper 30 having an agitating device 31 therein. This agitating device 31 takes the form of a finger which has an oscillatory movement in a vertical plane within the hopper. It is operated by means of a crank arm 32 and links 33 and 34, the latter of which is loosely connected to the extremity of the lever 22 as at 35. Leading from the lower end of the hopper 30 is the vertical slide 29 and this slide is preferably provided throughout its length on one side thereof with a slot 36. The vertical slide 29 carries a resilient wire, one end of this wire being fastened rigidly to the slide as at 37 and the other end being curved to form an elbow 38 which extends into the slot of the vertical slide for a sufficient distance to afford a frictional check upon the downward movement of the washers therein. The wire is of such shape that it affords a lateral extension 39 that is to be operated by a finger to be described for intermittently releasing a washer.

Cooperating with the vertical slide 29 and located immediately beneath the same, I have provided a sliding plate 40 having a slot in its end as at 41 and cut away as at 42 and at 43. This slide is reciprocable between a finger 44 and the bottom of the slide 29 by means of a lever 45 having a slot and pin connection to the slide as at 46 and fulcrumed at 47. The opposite end of the lever carries a roller 48 normally held in contact with a cam 49 by means of a tension spring 50. More explicitly, the pocket or cutaway portion 42 of the slide is designed to be moved a sufficient distance to the right (see Figure 5) so that it will receive a washer from the lower end of the slide 29. The washer first strikes on its edge in this pocket 42 and as the movement of the slide toward the right continues, the washer drops over on its side. Return of the slide, carries the washer with it within the pocket 42 until the finger 44 stops further movement of the slide, which occurs at the time that the washer is directly over the insulator parts with its aperture in concentric relation to the registering holes in these parts. Shortly after this, the nail is forced down through the washer and into the insulator and after the nail has entered the insulator but before it has completed its downward movement, the slide 40 is withdrawn to select a new washer. It will be noted, however, that the slide 40 carries a finger 95 which abuts the extension 39 of the washer retaining finger just prior to the end of the movement of the slide toward the left. The further movement of this slide toward the left presses the spring-like finger toward the left sufficiently to release the washers in the slide from the retaining effect of the inwardly bent portion 38. The result is that the moment one washer comes into proper position above the insulator parts, another washer drops down past the retaining portion 38 of the resilient finger and is ready to pass into the pocket 42 upon the return of the slide. It will be noted that the cam 49 is mounted upon the main driving shaft 100.

Figure 7:
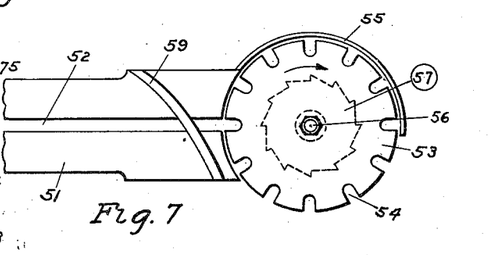
Figure 7 is a plan view of the lower end of the nail delivery trough and nail receiving head.
Figure 9:
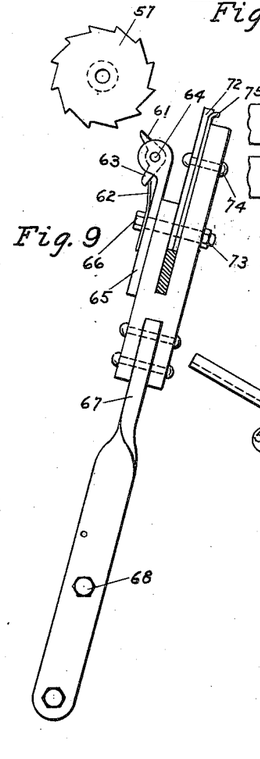
Figure 9 is a detail view of the nail selecting magnet together with the ratchet carried by the nail receiving head and the dog which operates the said ratchet.

The nail delivering apparatus comprises an inclined trough 51 having a slot throughout its length which is of sufficient breadth to permit of the passage of the shanks of the nails therethrough but not to permit of the passage of the nail heads therethrough. This slot is designated 52 and extends downwardly to and through the lower end of the trough which is concave and which partially embraces a nail-carrying head 53. The nail-carrying head 53 is provided at determinate intervals in its periphery with groves 54 that are designed to successively register with the lower end of the slot 52 as shown in Figure 7. The nail-carrying head is also partially embraced by a guard 55 and is designed to move in the direction of the arrow. It is mounted upon a shaft 56 and this shaft 56 carries at its lower end a ratchet wheel 57 adjustably mounted thereon by means of set screw 58.

Extending across the upper face of the inclined trough adjacent its lower end, I have provided a guard plate 59 which has a cut out portion 60 of sufficient depth to permit the passage of the nails under the guard plate, providing these nails are moving down the trough in an upright position and with their shanks extending downwardly through the slot 52 as shown in Figure 8. However, if the nails are not in this position, the guard plate will absolutely preclude any further downward passage of the nails. For instance, if one nail has failed to fall into proper position, that is, if the shank thereof has not dropped through the slot 52 and the nail is rolling down the trough, it will be intercepted by the guard plate 59 and guided entirely off the trough onto the floor or into any receptacle provided therefor.

The nail-receiving head 53 is rotated with a step-by-step movement by means of a spring-pressed dog 61 held in proper position by a spring 62 bearing against a heel 63 of this dog, the dog being mounted pivotally upon a pin 64. The pin which carries the dog is mounted upon a plate 65 bolted as at 66 to a lever 67. This lever 67 is fulcrumed as at 68 and is held in operative relation to a cam 69 upon the shaft 100 by means of a tension spring 70. The end of the lever which is held in contact with the cam 69 is provided with a roller 71.

Carried on the lever 67 immediately adjacent the dog 61 is a magnet 72 which is bolted thereto as at 73 and 74 and which is supplemented by a rounded guard finger 75.

In operation of this nail-selecting device, the cam 69 together with the spring 70 serves to move the dog 61 into position to rotate the ratchet 57 one tooth. When this occurs, a new nail-receiving socket or groove is moved into registry with the lower end of the slot 52. At the same time, a nail-containing slot or groove 54 passes out from the guard 55 which has previously served to prevent removal of the nails in a lateral direction either accidentally or otherwise. As this socket passes out from control of the guard 55, the magnet 72 sufficiently approaches the nail so that it will pick up the same. However, if it passes slightly beyond the nail, this nail will then be drawn into the crotch between the magnet 72 and the finger 75. Further movement of the cam in conjunction with the operation of the spring 70 will cause the magnet to carry the nail to a position immediately above the washer which, at this time, is immediately above the insulator and is being held in this position by the slide 40 and the finger 44. A plunger device is provided which, at this time, comes into operation to force the nail downwardly through the washer and through the insulator.

The plunger which forces the nail downwardly through the washer and through the insulator parts is designated 76 and it will be seen that it is rigidly connected to the link 34 which is carried by the lever 22. The operation is such that immediately after the plunger starts to force the nail downwardly through the washer and through the insulator parts, the magnet is moved away by the cam 69 which is operating upon the lever 67. During the downward progression of the plunger and before the nail has been forced completely downward, the slide 40 has moved to the right a sufficient distance to remove itself from interference with the movement of the washer into contact with the upper end of the insulator.

Figure 3:
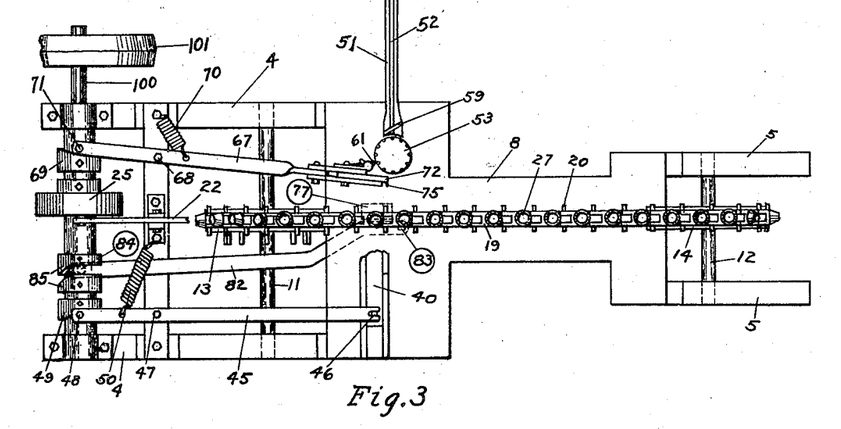
Figure 3 is a plan view of the structure shown in Figure 2 with the nail plunger removed therefrom and showing only a part of the washer delivering apparatus.
Figure 10:
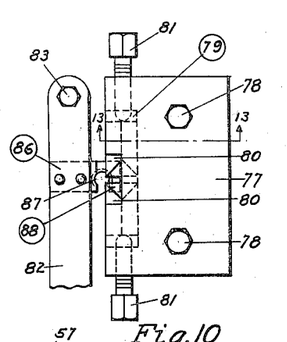
Figure 10 is a bottom plan view of the nail lipping die member and the lever complemental thereto.
Figures 11, 12, 13:
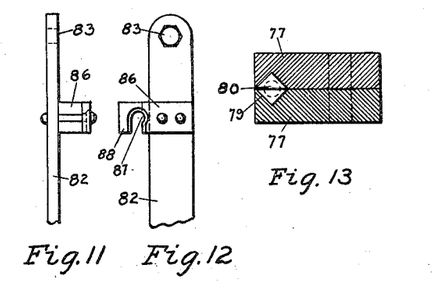
Figure 11 is a side elevation of the lever shown in Figure 10.
Figure 12 is a plan view of this lever shown in Figures 10 and 11.
Figure 13 is a section taken on line 13—13 of Figure 10.

Carried on the under side of the bed plate 8 of the machine and upon one side of the position assumed by the nail after it has been forced downwardly by the plunger there is provided a die housing shown best in Figures 10 and 13 and designated 77. This die housing is formed in two parts which are clamped together by screw bolts 78 and which are provided with opposed angular sockets 79 which register for the reception of die tools 80. These die tools are adjustable with relation to each other by means of bolts 81 and they are designed to be so positioned with relation to each other that the tools will be spaced apart a distance slightly less than the diameter of the nails. Complemental to this member 77, I have provided a lever 82 which is fulcrumed at one extremity as at 83 and which is provided at its opposite extremity as at 84 (see Figure 3) with a roller for cooperation with a cam 85 upon the shaft 100. This lever 82 is provided with a piece 86 having a semi-circular nail socket 87 and is designed to be so actuated by the cam 85 that the nail will be forced against the corner of the die tools with the result that a portion of the nail will be swaged out upon either side of its center. This swaged out portion will be such that there will be formed lugs of a size sufficient to preclude removal of the nail from the insulator part. When this swaging action has occurred, the assembling operation has been completed. The cam structure is such that the swaging action is effected immediately after the nail reaches its lowermost position under the impetus of the plunger. The lever 82 is further preferably provided with a hook-like finger member 88 that extends downwardly in substantially parallel relation to the lever 82 and serves upon movement of this lever away from the die element 77 to ensure that the nail will be drawn away from the die tools. The result is that the necessary swaging action is effected without weakening the nail while continued operation ensures that the nail will be positively precluded from sticking between the corners of the die tools. It will be understood that the nail fits the insulator part with sufficient looseness to permit of this lateral movement which need only be very slight.

All of these operations, that is, placing of the washer, positioning of the nail, forcing of the nail through the washer and insulator and swaging or lipping the nail are completed before the cup carrying chain starts again upon its step-by-step movement. Shortly after it starts upon this step-by-step movement, the nail which has just been swaged or lipped comes into abutting relation to the hub 15 and in riding thereon, the nail is forced upwardly and then the insulator is forced upwardly to ensure that it will have no tendency to stick within the cup. As the cup containing the insulator passes over the pair of sprockets 13 it comes to a point where it will fall as an entirety down into a receptacle provided therefor.

In conclusion, it may be stated that I believe myself to be the first to produce a machine which successfully assembles insulator parts and produces a lipping of the nail to ensure that these parts will be maintained in assembled relation. My structure is such that the nail and the washer for each insulator knob are moved into position above the knob parts at substantially the same time. Then the nail is forced downwardly through the washer and into the knob structure. After the nail has entered the knob structure but before it has reached its lowermost position, both the nail transferring member and the washer transferring member are withdrawn so that it is possible for the nail driving plunger to drive the nail fully home. There are many other features of importance of my invention and these will be set forth in the appended claims.

Having thus described my invention, what I claim is:

1. A machine for assembling insulator knobs comprising a means for conducting superimposed knob portions to an assembling station, means for placing a washer above each knob as it reaches assembly position, means for placing a nail in position and driving it down through the openings in said washer and knob, and means for lipping the nail.

2. A machine for assembling insulator knobs comprising means for moving the superimposed parts of said knobs to an assembly position, means for placing a washer above said knobs in assembly position, means for moving a nail to a position above said washer and said knob parts, means for driving such nail through said washer and said knob parts, means for lipping said nail, and means for insuring the removal of the assembled knob from said machine.

3. A machine for assembling insulator knobs comprising means for successively moving superimposed insulator parts to an assembly station, means for selecting a nail for each knob and placing it immediately above the knob, means for selecting a washer for each knob and placing it above the knob, means for driving a nail through said washer and said knob, means for lipping the nail adjacent its lower end after it has passed through the washer and the knob, and means for assisting in ejectment of the assembled knob from the machine by application of pressure automatically upon the point of the nail.

5. A machine for assembling insulator knobs comprising a carrier designed to receive superimposed insulator parts and to conduct them successively to an assembly station, a vertical slide designed to feed washers vertically downward upon their edges, a slide for intermittently selecting washers and presenting them on their sides to a position above the insulator knobs at the assembly station, means for selecting and passing a nail through said assembled knobs and washers, and means for lipping the nail of each knob member adjacent its lower end.

5. A machine for assembling insulator knobs comprising a carrier for receiving superimposed insulator parts and conducting them to an assembly station, a washer selecting and applying device comprising a hopper, a vertical slide down which the washers are adapted to pass upon edge, a sliding member beneath said vertical slide and having a pocket therein, said sliding member being operated to intermittently select a washer and turn it over on its side and then deliver it to a position above the insulator knob, means for selecting a nail for each insulator knob, moving it into position and driving it through the washer and insulator knob parts, and means for lipping the nail adjacent its lower end.

6. A machine for assembling insulator knobs comprising a carrier designed to receive the knob parts and carry them to an assembly station, a means for delivering a washer to a position above each insulator knob at the assembly station, a means for centering each washer a means for passing a nail through each insulator knob and the washer mounted thereon, and a means for lipping the nail.

7. A machine for assembling insulator knobs comprising a carrier designed to receive superimposed insulator parts and to successively conduct them to an assembly station, means for placing a washer above said insulator parts, a magnet member for selecting a nail for each insulator knob and moving it into position directly above and in vertical alignment with the openings through the washer and insulator parts, a plunger for driving the nail downwardly through the washer and insulator parts, and a nail lipping device.

8. A machine for assembling insulator knobs comprising a carrier designed to receive superimposed insulator knob parts and conduct said parts successively in superimposed pairs to an assembly station, means for placing a washer above each knob in assembly station, an inclined trough for delivering nails in a row, a means for selecting nails successively from the end of said trough and maintaining them in spaced relation to each other, a magnet for selecting a nail from said last-named means and moving it to a position above each insulator as it reaches assembled position, a plunger for driving said nail through said washer and through the insulator parts, and a nail lipping device.

9. A machine for assembling insulator knobs comprising a carrier designed to receive superimposed parts of insulator knobs and conduct them to an assembly station, a means for successively presenting washers to a position above the insulator knobs as they reach the assembly station, a nail selecting device comprising an inclined slotted trough, an inclined guard extending across said trough of such a structure that any nail which passes down the trough in improper position will be deflected off the trough, and a magnet for selecting the nails successively and moving them to a position above the insulator parts, a plunger for driving each nail through the insulator and the washer thereabove, and a nail lipping device.

10. A machine for assembling insulator knobs comprising a carrier designed to receive and successively present superimposed parts of insulator knobs to an assembly station, means for presenting a washer to a position above each knob as it reaches the assembly station, means for selecting a nail and passing it through the assembled knob and washer, and a nail lipping device comprising adjustable die tools.

11. In a machine for assembling insulator knobs means for feeding the knobs, knob fastening selecting means, a washer selecting device comprising a slide down which the washers are adapted to move, a slide for selecting the washers one by one at the base of said slide and successively presenting them to an assembly station, and means for assembling said knob portions, washers and fastening means.

12. In a machine for assembling insulator knobs, a washer selecting device comprising a vertical slide down which the washers are adapted to move on edge, and a slide at the base of said first slide constructed and operative to select the washers one by one, turn them on their sides and successively present them to the assembly station.

13. In a machine for assembling insulator knobs, a washer selecting device comprising a vertical slide, a hopper at the upper end of said slide constructed and operative to feed the washers into said slide in superimposed relation and upon edge, a trigger normally holding said washers against downward movement, a sliding member at the base of said slide for receiving said washers and moving them to an assembly station, and a tripping member carried by said sliding member and operative to release said trigger at every complete reciprocation of said sliding member to deliver a washer thereto.

14. In a machine for assembling insulator knobs, a washer selecting device comprising a vertical slide, a hopper at the upper end of said slide constructed and operative to feed the washers into said slide in superimposed relation and upon edge, a trigger normally holding said washers against downward movement, a sliding member at the base of said slide for receiving said washers, turning them on their sides and moving them to an assembly station, and a tripping member carried by said sliding member and operative to release said trigger at every complete reciprocation of said sliding member to deliver a washer thereto.

15. In a machine for assembling insulator knobs, a washer selecting device comprising a vertical slide, a hopper at the upper end of said slide constructed and operative to feed the washers into said slide in superimposed relation and upon edge, an agitating device in said hopper, a trigger normally holding said washers against downward movement, a sliding member at the base of said slide for receiving said washers, turning them on their sides and moving them to an assembly station, and a tripping member carried by said sliding member and operative to release said trigger at every complete reciprocation of said sliding member to deliver a washer thereto.

16. In a machine for assembling insulator knobs, a means for conducting knob portions to an assembling station in superimposed relation, a means for successively presenting washers to a position above said knobs at the assembly station, a means for forcing a nail downwardly through said washer and said knob, and a means for withdrawing said washer presenting means while said nail is being forced downwardly and after it has passed through the washer and into the insulator knob parts.

17. In a machine for assembling insulator knobs, a means for conducting knob portions to an assembling station in superimposed relation, a means for selecting nails successively and delivering them to a position above said knobs, a means for selecting washers successively and delivering them to a position above said knobs, a means for forcing said nails downwardly through said washer and said knob, said nail selecting and delivering means being operative to release said nail after it has started to move downwardly and into the insulator knob portions.

18. In a machine for assembling insulator knobs or the like, means for feeding knob parts, means for assembling a fastening means with said knobs and a lipping device comprising adjustable die tools for lipping said fastening means.

19. In a machine for assembling insulator knobs consisting of a plurality of knob parts and a fastening article, a lipping device comprising a die member, and a lever member operative to force said article into position to be swaged by said die member.

20. In a machine for assembling insulator knobs consisting of a plurality of knob parts and a fastening article, a lipping device comprising a die member, and a lever member operative to force said article into position to be swaged by said die member and operative to positively withdraw the article from said die member.

21. In a machine for assembling insulator knobs consisting of a plurality of knob parts and a fastening article, a lipping device comprising a die member, a lever member operative to force said article against said dies to effect a swaging thereof, and a hook-like finger embracing said article to ensure removal of said nail from said dies at the swaging.

22. In a machine for assembling insulator knobs, a knob carrier for feeding the knobs comprising cups with apertures in their bottoms, and means for successively presenting said cups and knobs to an assembling station.

23. In a machine for assembling insulator knobs, a knob carrier comprising cups with apertures in their bottoms, means for assembling knob portions, a washer and a nail and driving said nail through said assembled parts, means for lipping said nail after it has been driven through said parts, and means for insuring the removal of said assembled knob from its cup.

24. In a machine for assembling insulator knobs, a knob carrier comprising cups with apertures in their bottoms, means for assembling knob portions, a washer and a nail and driving said nail through said assembled parts, means for lipping said nail after it has been driven through said parts, and a cam surface with which the nail contacts as the insulator knob moves away from the assembling station with the result that ejectment of the assembled knob is initiated.

25. In a machine for assembling insulator knobs or similar articles, a knob carrier, means for assembling knob portions, a washer and a nail and driving said nail through said assembled parts, and means acting upon said nail for insuring maintenance of said parts in assembled relation.

26. In a machine for assembling insulator knobs or similar articles, means for assembling knob portions, a washer and fastening article and driving said fastening article through said assembled parts, and means acting upon said article for insuring maintenance of said parts in assembled relation.

27. A machine for assembling insulator knobs, comprising a knob carrier, means for assembling knob portions, a washer and a fastening article and driving said fastening article through said assembled parts, and means for lipping said fastening article after it has been driven through said parts.

28. A machine for assembling insulator knobs, comprising a knob carrier, and means for assembling knob portions, a washer and a fastening article and driving said fastening article through said assembled parts.

29. A machine for assembling insulator knobs, comprising a knob carrier, means for assembling knob portions and a fastening article and driving said fastening article through said assembled parts, and means for lipping said fastening means after it has been driven through said parts.

30. A machine for assembling insulator knobs or similar articles comprising means for automatically assembling knob portions and a fastening article, and means for insuring the positive removal of the assembled knob portions from the machine.

31. A machine for assembling insulator knobs or similar articles comprising means for assembling knob portions, a washer and retaining means and means for driving said retaining means through said assembled parts.

32. A machine for assembling insulator knobs or similar articles comprising means for automatically assembling knob portions, a washer and retaining means, and driving said retaining means through said assembled parts, and means for insuring the positive removal of the assembled knob portions from the machine.

33. A machine for assembling insulator knobs or similar articles comprising means for assembling said knobs and an article for fastening said knobs to a support, and means for automatically securing said knobs to said fastening article in assembled relation.

34. A machine for assembling insulator knobs comprising a means for conducting superimposed knob portions to an assembling station, means for placing a washer above each knob as it reaches assembly position, and means for placing a nail in position and driving it down through the openings in said washer and knob.

35. A machine for assembling insulator knobs comprising a knob carrier, washer selecting and transferring means, nail selecting and transferring means and means for permanently assembling said parts.

36. A machine for assembling insulator knobs comprising an assembly station, means for presenting knob portions to said station, a magnet for transferring fastening articles to said station and means for assembling said parts.

37. A machine for assembling insulator knobs comprising an assembly station, means for presenting knob portions to said station, a magnet for transferring fastening articles to said station, washer selecting means and means for assembling said parts.

38. A machine for assembling insulator knobs comprising an assembly station, means for presenting knob portions to said station, a magnet for transferring fastening articles to said station, and means for permanently assembling said parts.

39. Insulator assembling apparatus comprising means for presenting knob portions to an assembly station, feeding a washer into vertical alinement with said knobs, and forcing a retaining means through said washer and knobs and means for insuring the positive removal of the assembled knobs from the machine.

40. A machine for assembling insulator knobs comprising means for temporarily holding the knob parts at an assembly station and means for automatically positioning a washer and a nail in assembled relation to the knob parts.

41. A machine for assembling insulator knobs or similar articles, comprising means for assembling a plurality of knob portions and a retaining means and driving said retaining means through said knob portions.

42. A machine for assembling insulator knobs comprising means for automatically feeding the knob portions and a retaining means, and means for lipping said retaining means to permanently assemble the parts.

In testimony whereof I hereby affix my signature.

ALEXANDER CARPENTER.